(12) United States Patent
Rudi et al.

(10) Patent No.: US 12,208,773 B2
(45) Date of Patent: Jan. 28, 2025

(54) HOLDING DEVICE FOR A MOTOR VEHICLE

(71) Applicant: MOTHERSON INNOVATIONS COMPANY LIMITED, London (GB)

(72) Inventors: Artem Rudi, Stuttgart (DE); Mukesh Patel, Stuttgart (DE)

(73) Assignee: Motherson Innovations Company Limited, London (GB)

( * ) Notice: Subject to any disclaimer, the term of this patent is extended or adjusted under 35 U.S.C. 154(b) by 881 days.

(21) Appl. No.: 17/018,239

(22) Filed: Sep. 11, 2020

(65) Prior Publication Data

US 2021/0078499 A1 Mar. 18, 2021

(30) Foreign Application Priority Data

Sep. 13, 2019 (DE) .................. 10 2019 124 730.6
May 4, 2020 (DE) .................. 10 2020 112 018.4

(51) Int. Cl.
| | | |
|---|---|---|
| *B60R 7/04* | (2006.01) | |
| *B60N 3/10* | (2006.01) | |
| *B60R 11/04* | (2006.01) | |
| *B60R 16/03* | (2006.01) | |
| *G06F 3/041* | (2006.01) | |
| *G06T 7/70* | (2017.01) | |
| *G06V 20/59* | (2022.01) | |

(52) U.S. Cl.
CPC ............ *B60R 7/04* (2013.01); *B60N 3/105* (2013.01); *B60R 11/04* (2013.01); *B60R 16/03* (2013.01); *G06F 3/041* (2013.01); *G06T 7/70* (2017.01); *G06V 20/59* (2022.01); *G06T 2207/30268* (2013.01)

(58) Field of Classification Search
CPC ....................................................... B60R 7/04
See application file for complete search history.

(56) References Cited

U.S. PATENT DOCUMENTS

| | | | |
|---|---|---|---|
| 10,420,417 B1 * | 9/2019 | Jones ................. | A47B 9/00 |
| 11,602,991 B2 * | 3/2023 | Bongard ............. | G06F 3/0482 |
| 2021/0240783 A1 * | 8/2021 | Ricci ................. | H04L 63/0428 |

FOREIGN PATENT DOCUMENTS

| | | |
|---|---|---|
| DE | 102008021679 A1 | 11/2008 |
| DE | 102017210640 | 12/2018 |
| DE | 102018202212 A1 | 8/2019 |
| KR | 100956480 B1 * | 10/2008 |
| KR | 20110107167 A * | 11/2008 |
| KR | 20100026374 A * | 10/2009 |
| KR | 20210060091 A * | 10/2019 |

OTHER PUBLICATIONS

Google Machine Translation of KR20100026374A (2008) (Year: 2008).*

German Office Action dated Aug. 25, 2020 of German application No. DE 102020112018.4.

* cited by examiner

*Primary Examiner* — Jean Paul Cass (74) *Attorney, Agent, or Firm* — Jones Day (57) ABSTRACT

A holding device for a motor vehicle for holding an object including a beverage container or a mobile device includes at least one active surface, one or more of a sensor system or a sensor surface for detecting at least part of the active surface, at least one adjustment means of the at least one active surface, and a control unit.

3 Claims, 7 Drawing Sheets

HOLDING DEVICE FOR A MOTOR VEHICLE

CROSS-REFERENCE TO RELATED APPLICATIONS

This application claims the benefit of foreign priority to German Patent Application No. 10 2019 124 730.6, filed Sep. 13, 2019, and German Patent Application No. 10 2020 112 018.4, filed May 4, 2020, each of which is hereby incorporated by reference in its entirety for all purposes.

BACKGROUND

1. Field of the Invention

The invention relates to a holding device for a motor vehicle for holding an object, in particular a beverage container and/or a mobile telephone, comprising at least one active surface and a sensor system for detecting at least a part of the active surface and a method for holding an object.

2. Related Art

For receiving objects, such as beverage cups, beverage bottles or the like, a plurality of shelves or bins is provided in motor vehicle. However, these cannot always hold the stored objects reliably. Rather, when accelerating, braking or cornering, the objects may fall out of the bin and either be damaged or cause damage within the motor vehicle.

To avoid damage or even injury, it is known to provide holding devices that adjust the position of a held object to the applied acceleration forces.

EP 214 457 B1 describes a free-running beverage holder, which should automatically adapt to the curve or acceleration situation in a motor vehicle. However, with such passive restraints, it cannot be guaranteed that the positional adjustment will be fast enough, especially in the case of sudden accelerations, e.g. to avoid leakage of the liquid contained in the held object.

Alternatively, it is known to provide drink holders with active positional adjustment. For example, DE 102007012643 A1 describes a mounted cup holder in which the position of a container held can be adjusted by means of active actuating means. In such active systems, however, complex actuators are usually necessary, which are both expensive and maintenance-intensive.

DE 102017128019 A1 discloses a holding device for at least one object, comprising a receiving region for the at least one object, wherein the receiving region comprises at least one holding element of a predetermined material, which by applying an electric and/or magnetic field from a rest configuration into a holding configuration for the at least one object can be brought, wherein at least one inner material property of the holding element changes when changing from the rest configuration to the holding configuration.

U.S. Pat. No. 8,870,144 B2 discloses a device comprising an active material. Activation of the active material causes deformation in the device to retain the object. In an embodiment, an object holder can include: a recess, a cover over the recess, and a switch to an active material to retain a deformed shape in the recess.

DE 102011115562 A1 discloses a holding device which can hold various objects with different geometrical shapes, sizes and/or dimensions, comprising an element of an active material.

U.S. Pat. No. 9,569,027 B2 discloses a system and a method for implementing a hidden touch surface including a touch detector to detect a touch applied to a finishing layer associated with the hidden touch surface; a touch sensor to sense an attribute associated with the touch; and a processor to associate the attribute with a predetermined command, wherein the finishing layer hides the hidden touch surface.

WO 2017078362 A1 discloses a vehicle including a plurality of displays disposed at different positions inside the vehicle, each display including a touch screen and a cover layer on a top surface of the touch screen, the cover layer of a corresponding display having a color characteristic based on an interior part of the vehicle having the display such that when the corresponding display is off, the corresponding display appears hidden; a sensor configured to detect a seat location of a person seated in the vehicle; and a controller configured to selectively control the plurality of the displays based on the detect seat location of the person seated in the vehicle.

A disadvantage of such motor vehicle holding devices is that the object does not conform to the tray in terms of its shape and geometry and therefore can be tossed and damaged during driving.

Another disadvantage of such holding devices is that the recesses are difficult to clean and can accumulate dirt.

SUMMARY

In an aspect, a holding device for a motor vehicle for holding an object, in particular a beverage container and/or a mobile telephone, includes at least one active surface, further comprising a sensor system and/or a sensor surface, wherein the holding device comprises at least one adjusting means of the active surface and a control means, wherein the holding device is configured such that, when the object is approaching the active surface or the object is in contact with the sensor surface, the object is detectable by means of the sensor system and/or the sensor surface, wherein the at least one adjustment means of the active surface is controllable by the control means to adjust the active surface to form a reception space for holding and/or receiving the object, in particular comprising a recess of the active surface.

Further, the sensor surface can be attached to the active surface as a further layer. The sensor surface can have a plurality of touch sensors. The touch-sensitive sensor surface can also be designed as an input device and an output device, as a touch-sensitive screen. The user can touch the sensor surface with his hand and, by executing individual touches or touch gestures, such as swiping, pressing and/or touching with one or more fingers, individual predefined commands can be transmitted to the computer and the control means. The user can transmit a command to the control means, for example, by touching the sensor surface at a specific predefined location, in order, for example, to create the first recess for the mobile telephone or the second recess for the beverage container by means of the control means and drive means. The active surface can, for example, have the sensor surface as a further layer only in a partial region. Alternatively, the sensor area can also completely cover each area of the active area as a further layer.

The sensor surface can have different arrangements of the touch sensors, such as a rectangular grid of rectangular touch sensors or in the form of several concentric circles. When one of the touch sensors is touched, a signal is then transmitted to determine the location of the touch on the sensor surface.

The sensor surface with the touch sensors can be based on different functional principles, such as resistive systems, surface-capacitive systems, projected-capacitive systems, inductive systems, SAW (surface acoustic wave)—"(sound) wave-controlled systems", optical systems (usually infrared light grids in front of the monitor) or dispersive signal technology systems.

The user can, for example, bring his hand closer to the active surface or execute a specific gesture which can be detected by means of the sensor system, the sensor surface then being able to be activated in order to detect commands or commands by touching it. When using the sensor surface as an input means for the user, the according area of the active surface can be deactivated in order to enable a firm base for input by touching the sensor surface using the hand.

After removing the hand from a detection area of the sensor system or by executing a specific gesture, the sensor surface can be deactivated again and/or the active surface can be activated again in order to enable mechanical adjustment using the drive means.

The sensor surface with the touch sensors can also be used for the detection of the object, such as the mobile telephone or the beverage container, by the object being placed on the sensor surface and by the contact of the object with the sensor surface, wherein the dimensions and the type of object can be determined in this way. The active surface can then be controlled by means of the control means and adjusted by means of the drive means, for example in order to create the first recess or the second recess. The sensor system with the cameras and is therefore not absolutely necessary for this embodiment.

An advantage of the holding device is that the object is automatically detected by means of the sensor system and/or the sensor surface and automatically a suitable recess for this object is formed based on the input from the sensor system and/or the sensor surface. As a result, the object can be stored more securely in the suitable recess, so that damages to the object while driving are prevented.

Another advantage of the holding device is that the active surface forms a flat surface in a deactivated state and a suitable recess is formed only when an object is approaching. The recess is thus formed by the active surface only when it is used to deposit the object.

Advantageously, the active surface can be arranged on a center console, a head unit and/or a dashboard.

This allows the user to place the object, such as a cell phone or a beverage container, at a designated location similar to a conventional fixed recess.

Advantageously, the sensor system comprises at least one camera, preferably at least one 2D optical camera, a plurality of 2D optical cameras, an infrared sensor, an electromagnetic sensor and/or a 3D optical camera.

Any sensor system can be used, which can detect the shape and geometry of the object. For the present holding device, an existing sensor system of a motor vehicle, for example, a camera system for monitoring the interior, can be used.

Advantageously, the detection of the object can be carried out by means of a computer-based analysis device, wherein image data of the sensor system is analyzed and the object, in particular a beverage container and/or a mobile telephone, is recognized using a recognition algorithm.

As a result, the type of object and the dimensions of the object are detected fully automatically using a computer-aided detection algorithm in conjunction with the acquired image data of the sensor system. The recognition algorithm can also automatically detect a model of the object, for example a mobile telephone, so that a predefined recess is correspondingly formed by means of the active surface.

The recognition algorithm analyzes the image data of the sensor system and searches for shapes or structures of the searched object previously stored in a database, such of a mobile phone. As soon as the object has been detected by comparing the stored shape with the image data of the sensor system, a corresponding recess is formed by means of the active surface.

Alternatively, the detection algorithm can also detect an unknown object in the image data of the sensor system and in particular determine the shape and the distance of the object relative to the sensor system, so that the geometric dimensions of the object are automatically determined therefrom. Depending on these dimensions of the object, a suitable recess is then formed by means of the active surface.

Advantageously, an adjusting means of the active surface may comprise at least one drive means, wherein the drive means, in particular an electric motor, is controlled by the control means accordingly.

Thereby, the active surface is controlled by the control means and driven by the drive means, as desired, to form the predefined recess.

Other drive means may be used which are suitable for bringing the active surface into the desired shape to form the desired recess, such as dielectric elastomers, magnetic elements, electromagnets, mechanical drive means, shape memory materials and magnetorheological elastomers.

Advantageously, the formed reception space of the active surface may have a predefined form for receiving the object.

As a result, it is thus possible to store a plurality of shapes of different recesses, for example, for different models of mobile telephones, in a database. If a particular model of the object is detected, then the object is assigned to a matching record in the database and the active surface is driven accordingly to form the recess with the predefined form.

Advantageously, the reception space of the active surface can be formed depending on the shape or on the dimensions of the detected object so that the object fits into the formed reception space.

Thus, the holding device is designed so that the shape or the geometry of the object is detected using the sensor system and a suitable recess is calculated using a computer, in which case the active surface is controlled and adjusted in such a way that the suitable recess is formed.

Advantageously, in order to release the object, as soon as a body part, in particular a hand, approaching the active surface is detected by means of the sensor system, the active surface is retracted by means of the control means and adjustment means to its original shape.

As a result, the body part, such as a hand, is detected and the active surface is adjusted to the original shape, so that the object is raised again out of the recess and thus can be removed easier by the user.

Advantageously, the sensor surface is applied as a further layer on at least a partial region of the active surface, wherein the sensor surface is constructed from a plurality of touch sensors.

As a result, the sensor surface can deform together with the active surface, the object being able to be detected by the touch sensors when it is placed on the sensor surface. The dimensions and the type of object can then be determined in this way. Then a recess suitable for the determined dimensions of the object can be formed accordingly by means of the control means and the drive means.

Advantageously, the touch sensors are based a functional principle, as a resistive system, a surface-capacitive system, a projected-capacitive system, an inductive system, a surface acoustic wave systems or a dispersive signal technology system.

As a result, suitable touch sensors can thereby be used to detect the touch with the fingers of a hand of the user or with the object precisely enough.

Another object of the invention is a motor vehicle with the holding device according to the invention.

Another object of the invention is a method for holding an object by means of the holding device according to the invention, comprising the steps of detecting the object, which approaches the active surface within a field of view of the sensor system or is in contact with the sensor surface, by the sensor system and/or by the sensor surface, controlling at least one adjusting means of the active surface by control means in order to adjust the active surface to form a reception space for holding and/or receiving the object, in particular comprising a recess of the active surface.

An advantage of the method is that the object is automatically detected by means of the sensor system or the sensor surface and automatically a suitable recess for this object is formed. Thus, the object can be stored accurately in the recess, so that damages to the object while driving are prevented.

Advantageously, the method can further comprise analyzing image data of the sensor system by means of a computer-based analysis device, wherein the object is recognized using a recognition algorithm.

As a result, the method can further comprise detecting a body part, such as a hand, by the sensor system, as soon as the object is manually brought into the neighborhood of the active surface manually by the hand, adjusting the active surface using the control means and the adjustment means only when a predefined gesture of the hand is detected.

Advantageously, the method can further comprise detecting a hand by means of the sensor system, as soon as the hand approaches the object and adjusting the active surface by the adjustment means in such a way that it retracts to its original shape in order to release the object.

Thus, the recess is formed by the adjustment of the active surface only when a predefined gesture of the hand is detected. The predefined gesture of the hand may be, for example, a hand grip gesture made by a hand holding the object, such as a cellphone or a drinking cup.

Advantageously, the active surface is adjusted using the adjustment means only when a predefined gesture of the hand is detected in order to release the object.

As a result, the active surface is adjusted to the original shape as soon as a body part, such as a hand, is approximated to the active surface or brought into the field of view of the sensor system. The object is thus raised from the recess and is thus easier to remove for the user.

Advantageously, for removing the object from the recess of the active surface the hand can be detected by means of the sensor system and the active surface cab be adjusted using the adjustment means only when a predefined gesture of the hand is detected.

As a result, the active surface in the activated state is not restored to the original shape until the predefined gesture of the hand is detected in the vicinity of the active area. The defined gesture of the hand may be, for example, an OK gesture or a thumbs up gesture. After detecting this defined gesture, therefore, the active surface is deactivated and the object is raised from the recess, so that the user can remove the object more easily.

Advantageously, the method can further comprise the detection of the object by means of the sensor surface, the object being deposited on the sensor surface and being in contact with the sensor surface, wherein contact points of the object are detected using the sensor surface and thereby the shape or the type of the object is determined by analyzing signals of the sensor surface using a computer algorithm by means of a computer-based analysis device, wherein at the contact points of the object with the sensor surface using the control means the recess of the active surface is formed that matches the detected dimensions of the object.

In this way, the signals from the touch sensors of the sensor surface are analyzed and evaluated in a computer-assisted manner, wherein the dimensions and the type of the object are determined and a suitable recess being formed for the respective object.

Advantageously, the method can further comprise detecting a hand by the sensor system, as soon as the object is manually brought into the neighborhood of the active surface manually by the hand, then the sensor surface is being activated in order to detect touch commands by the user, wherein as soon as the object is removed from the neighborhood of the active surface, then the sensor surface is being deactivated.

In this way, the sensor surface is activated as soon as a hand or the object approaches the sensor surface. When removing the object or the hand, the sensor surface is deactivated again. This minimizes the resources and computing power of the computer-based analysis device. In addition, incorrect operations of the active surface are avoided.

BRIEF DESCRIPTION OF THE DRAWINGS

The aspects of the invention are shown in detail in the drawings, as follows.

DETAILED DESCRIPTION

Figure 1:
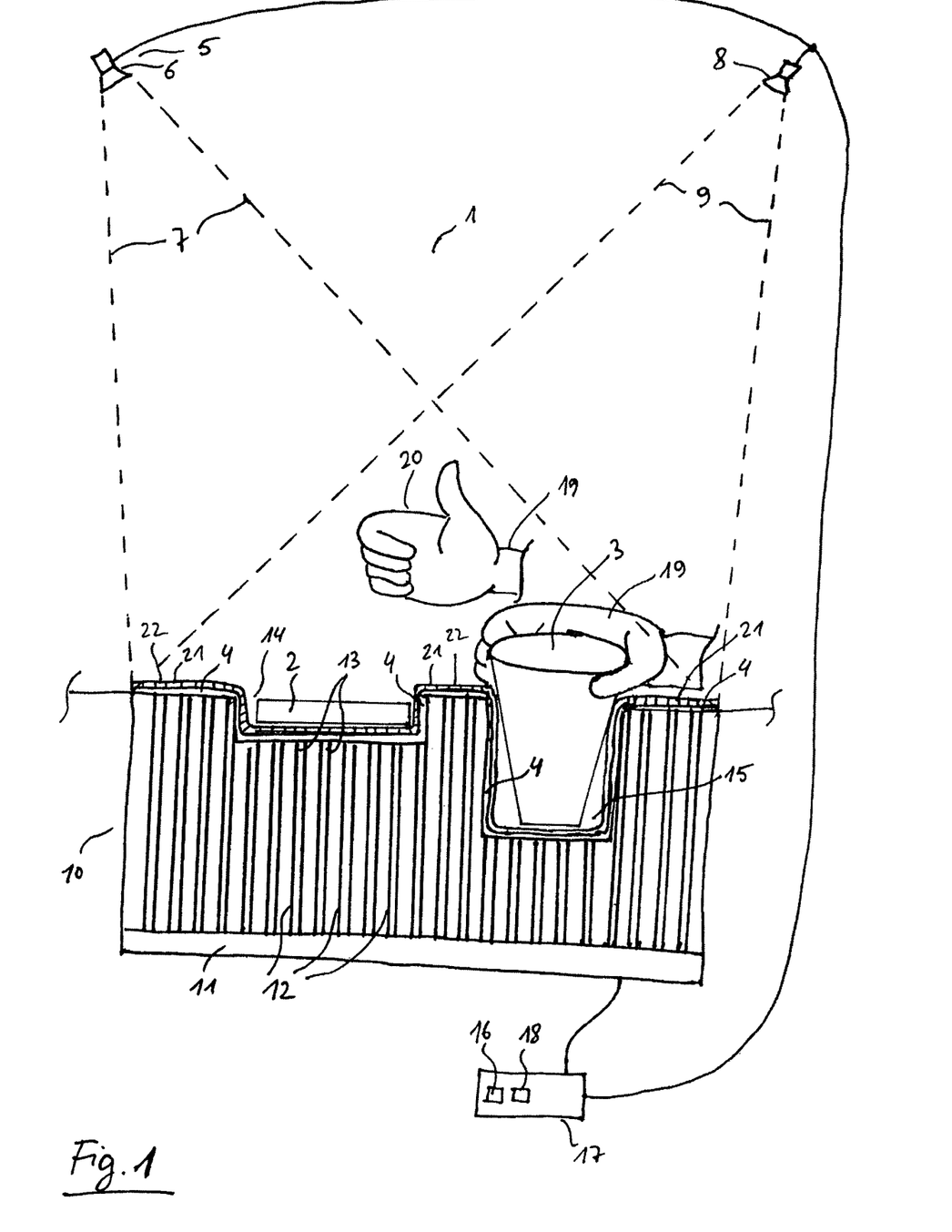
FIG. 1 is a schematic sketch of the holding device for holding an object, comprising an active surface and a sensor system.

FIG. 1 shows a schematic sketch of the holding device 1 for a motor vehicle for holding an object, such as a mobile telephone 2 or a beverage container 3, comprising an active surface 4, a sensor system 5, consisting of a first 2D optical camera 6 with a first field of view 7 and a second optical 2D camera 8 with a second field of view 9. The fields of view 7 and 9 of the sensor system 5 are dimensioned such that the complete active surface 4 is detected. An adjustment means 10, in an example, includes a drive means 11, such as an electric motor, and parallel bars 12. The active surface 4 can be adjusted by the individual bars 12, which are individually driven by the at least one drive means 11. The bars 12 are attached at an upper end 13 to the flexible active surface 4, so by adjusting the individual bars 12 the shape of the active surface 4 is deformed to a matching first recess 14 for the mobile phone 2 or a second recess 15 for the beverage container 3. The image data of the sensor system 5 is transmitted to an analysis device 16, such as a computer 17 or a microchip with corresponding software, and is analyzed using a recognition algorithm, wherein the object, such as the mobile phone 2 or the beverage container 3, is automatically detected. Subsequently, the drive means 11 is controlled by means of a control means 18, such as a computer 17 or a microchip with appropriate software, and thus the active surface 4 is adjusted to form the recesses 14 and 15 which are precisely fitting the objects 2 and 3. To activate the active surface 4, a hand 19 of a user who holds the object 3 is detected by means of the sensor system 5. As soon as the hand 19 brings the object 3 into the neighborhood of the active surface 4, the active surface 4 is activated and the adjustment device 10 is activated by means of the control means 18 in such a way that the matching recess 15 is formed. To deactivate the active surface 4 a hand 19 is brought in the neighborhood of the active surface 4 or in the neighborhood of the respective recesses 14 or 15 and is detected by the sensor system 5, wherein the control means 18 controls the adjustment means 10 so that the active surface 4 moves back to an original shape and thus the object 2 or 3 is moved out of the respective recess 14 or 15 for an easier removal. The deactivation of the active surface 4 can also be triggered only if a defined gesture 20 of the hand 19, such as the OK gesture or thumb-up gesture, is detected by the sensor system 5.

Further, a sensor surface 21 is attached to the active surface 4 as a further layer. The sensor surface 21 can have a plurality of touch sensors 22. The touch-sensitive sensor surface 21 can also be designed as an input device and an output device, as a touch-sensitive screen. The user can touch the sensor surface 21 with his hand 19 and, by executing individual touches or touch gestures, such as swiping, pressing and/or touching with one or more fingers, individual predefined commands can be transmitted to the computer 17 and the control means 18. The user can transmit a command to the control means 18, for example, by touching the sensor surface 21 at a specific predefined location, in order, for example, to create the first recess 14 for the mobile telephone 2 or the second recess 15 for the beverage container 3 by means of the control means 18 and drive means 11. The active surface 4 can, for example, have the sensor surface 21 as a further layer only in a partial region. However, the sensor area 21 can also completely cover each area of the active area 4 as a further layer.

The sensor surface 21 can have different arrangements of the touch sensors 22, such as a rectangular grid of rectangular touch sensors 22 or in the form of several concentric circles. When one of the touch sensors 22 is touched, a signal is then transmitted to determine the location of the touch on the sensor surface 21. The sensor surface 21 with the touch sensors 22 can be based on different functional principles, such as resistive systems, surface-capacitive systems, projected-capacitive systems, inductive systems, SAW (surface acoustic wave)—"(sound) wave-controlled systems", optical systems (usually infrared light grids in front of the monitor) or dispersive signal technology systems.

The user can, for example, bring his hand 19 closer to the active surface 4 or execute a specific gesture 20 which can be detected by means of the sensor system 5, the sensor surface 21 then being able to be activated in order to detect commands or commands by touching it. When using the sensor surface 21 as an input means for the user, the according area of the active surface 4 can be deactivated in order to enable a firm base for input by touching the sensor surface 21 using the hand 19.

After removing the hand 19 from the field of view of the sensor system 5 or by executing a specific gesture 20, the sensor surface 21 can be deactivated again and/or the active surface 4 can be activated again in order to enable mechanical adjustment using the drive means 11.

The sensor surface 21 with the touch sensors 22 can also be used for the detection of the object, such as the mobile telephone 2 or the beverage container 3, by the object being placed on the sensor surface 21 and by the contact of the object with the sensor surface 21, wherein the dimensions and the type of object can be determined in this way. The active surface 4 can then be controlled by means of the control means 18 and adjusted by means of the drive means 11, for example in order to create the first recess 14 or the second recess 15. The sensor system 5 with the cameras 6 and 8 is therefore not absolutely necessary for this embodiment.

Figure 2:
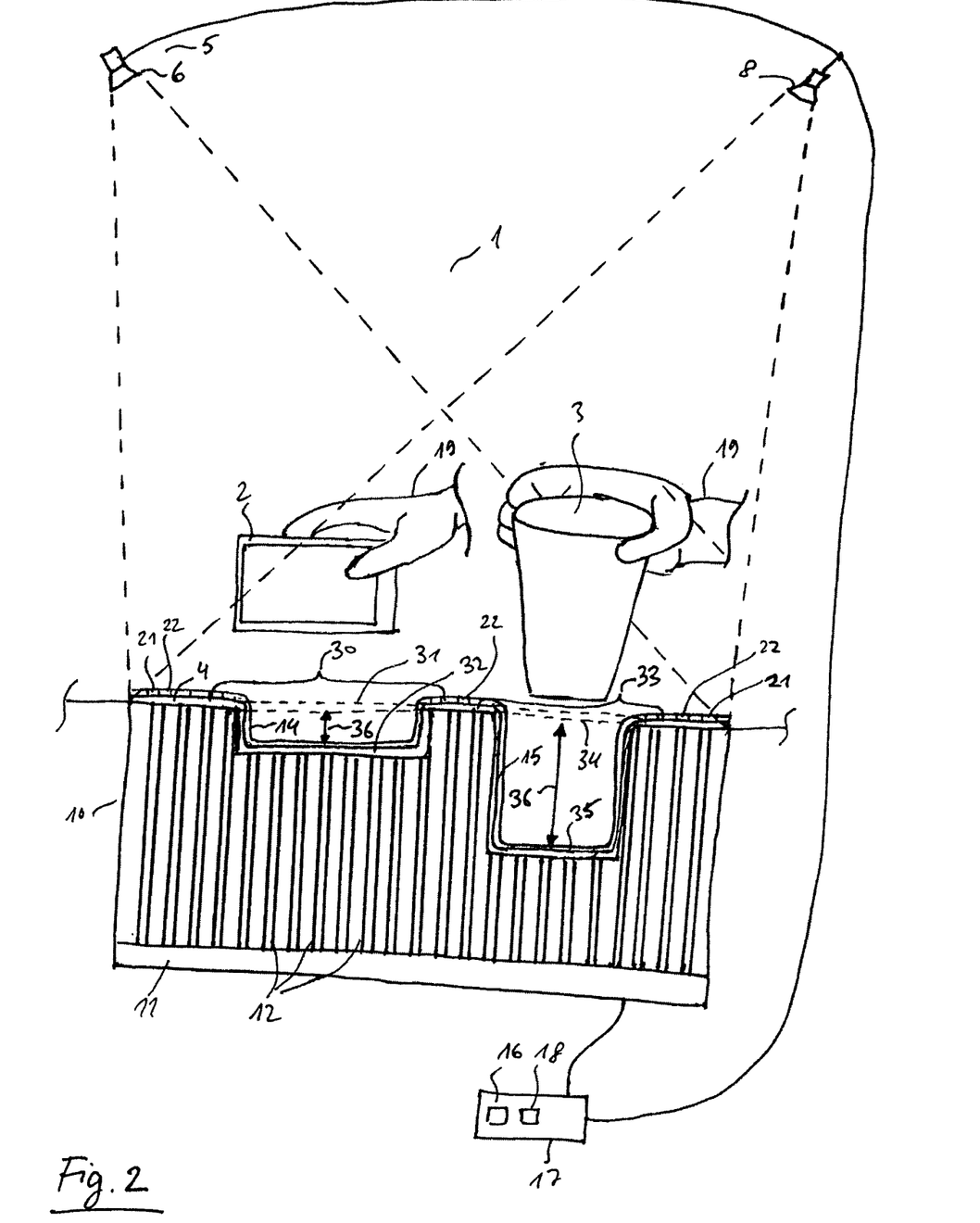
FIG. 2 is a schematic sketch of the holding device of FIG. 1 to illustrate the adjustment between an activated state of the active surface and a deactivated state of the active surface.

FIG. 2 shows a schematic sketch of the holding devices of FIG. 1 to illustrate the adjustment of the active surface 4. As soon as the hand 19, holding the mobile phone 2, is detected in the neighborhood of a first predetermined region 30 of the active surface 4 for storing the mobile phone 2 by means of the sensor system 5, comprising the cameras 6 and 8, the active surface 4 in the first region 30 is set to an activated state, wherein the active surface 4 is adjusted by means of the adjustment means 10 from an original shape 31, which is shown in dashed lines, into an activated shape 32. As soon as the hand 19, holding the beverage container 3, is detected near a second predetermined region 33 of the active surface 4 for depositing the beverage container 3 by means of the sensor system 5, the active surface 4 in the second region 33 is set to an active state, wherein the active surface 4 in the second region 33 is adjusted by means of the adjustment means 10 between an original deactivated form 34, shown in dashed lines, and an activated form 35 to create the corresponding recess 15, as indicated by the arrow 36. In order to deactivate the active surface 4, as soon as a hand 19 without an object 2 or 3 is detected by means of the sensor system 5 and the analysis unit 16 in the neighborhood of the first region 30 or the second region 33, the active surface 4 of the regions 30 or 33 is deactivated and moved into the original deactivated form 31 or 34, to remove the object 2 or 3 more easily.

The sensor surface 21 with the touch sensors 22 is arranged as a further layer on the active surface 4, so that by deforming the active surface 4 and forming the depressions 14 and 15, the sensor surface 21 is also deformed. The sensor surface 21 can be used in addition to the sensor system 5 or alternatively to the sensor system 5 for the detection of the object 2, 3. The sensor surface 21 can also be used as an input means for inputting touch commands by the user.

Figure 3:
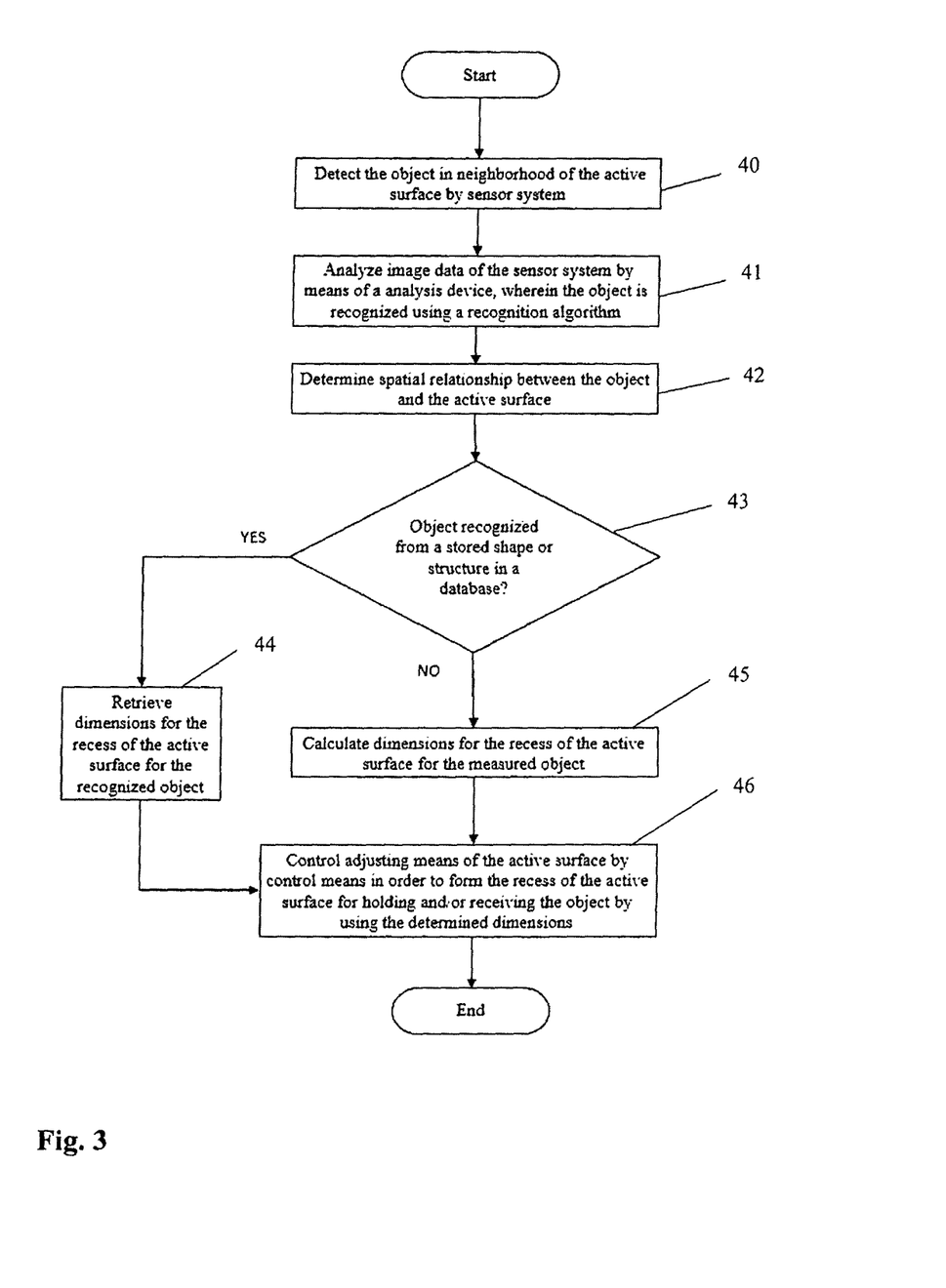
FIG. 3 is a flow chart to illustrate a method to create a recess using the active surface.

FIG. 3 shows a flowchart to illustrate an exemplary method for holding an object according to the present invention. The method begins at step 40, where the object 2, 3 is detected in the neighborhood of the active surface 4 using the sensor system 5. In the second step 41, the image data of the sensor system 5 is analyzed by means of the analysis device 16, wherein the object 2, 3 is detected computer-assisted by means of a recognition algorithm. In this case, known recognition algorithms can be used which recognize objects on the basis of their shape, structure or specific features. In the third step 42, the position of the object 2, 3 is determined relative to the active surface 4, so that in particular the distance and thus the dimensions of the object 2, 3 can be determined. In step 43, it is decided whether the detected object 2, 3 matches with a data set from a database, wherein the data sets can contain known shapes or structures of certain models of mobile telephones 2. If the object 2, 3 matches a particular data set from the database, in step 44 the determined dimensions are used to determine the dimensions of the recess of the active area. If the detected object 2, 3 does not coincide with any of the data sets from the database, the precise geometric dimensions of the object 2, 3 are determined on the basis of the distance of the object 2, 3 relative to the active surface 4 and on the basis of the shape of the object. In step 46, the determined dimensions of mating recess 14, 15 are used to control adjusting means 10 of the active surface 4 by control means 18 in order to form the recess 14, 15 of the active surface 4 for holding and/or receiving the object.

Figure 4:
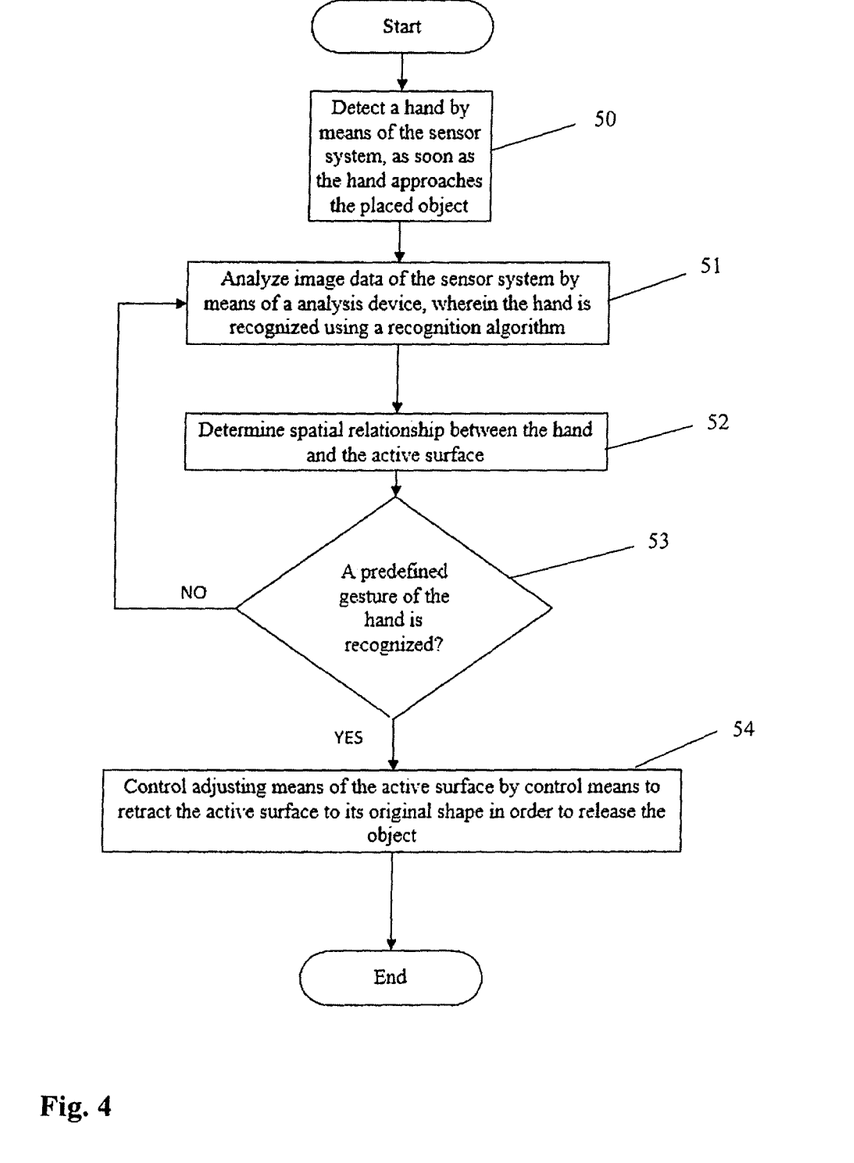
FIG. 4 is a flow chart to illustrate a method to release the object from the active surface.

FIG. 4 shows a flowchart to illustrate an exemplary method for releasing an object according to the present invention. In the first step 50, a hand 19 is detected by means of the sensor system 5 as soon as the hand 19 approaches the object 2, 3 positioned in the recess 14, 15. In step 51, the image data of the sensor system 5 is analyzed by means of the analysis device 16, wherein the hand 19 is automatically recognized by means of the recognition algorithm due to the characteristic shape. In step 52, the position of the hand 19 relative to the active surface 4 is determined. In step 53 it is decided whether a predefined gesture 20 of the hand 19 is recognized. The predefined gesture 20 may be, for example, the O.K. gesture or a thumbs up gesture. If no predefined gesture 20 is detected, the process returns to step 51 for analyzing the image data. If a predefined gesture 20 is detected, in step 54 the adjusting means 10 of the active surface 4 are controlled by control means 18 to retract the active surface 4 to its original shape in order to release the object 2, 3.

Figure 5:
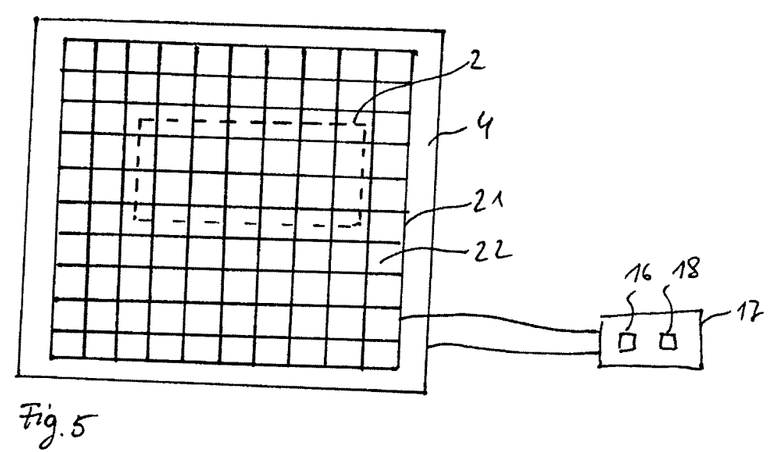
FIG. 5 is a sketch of a rectangular active area.

FIG. 5 shows a sketch of an active area 4, wherein at a partial area of the active area 4 a sensor area 21 is arranged in the form of a rectangular grid with rectangular touch sensors 22. The object in the form of a mobile telephone 2, which is shown in dashed lines, is placed on the sensor surface 21 and thus comes into contact with the sensor surface 21, so that the signals from the touch sensors 22 are transmitted to the computer 17 and the analysis device 16. The analysis device 16 then analyzes the data of the touch sensors 22 and can determine the dimensions of the object 2 therefrom. The exact model or type of the mobile telephone 2 can also be determined by comparison with the dimensions of objects in a database. A suitable recess 14 is then formed for holding the object 2, as shown in FIG. 2.

Figure 6:
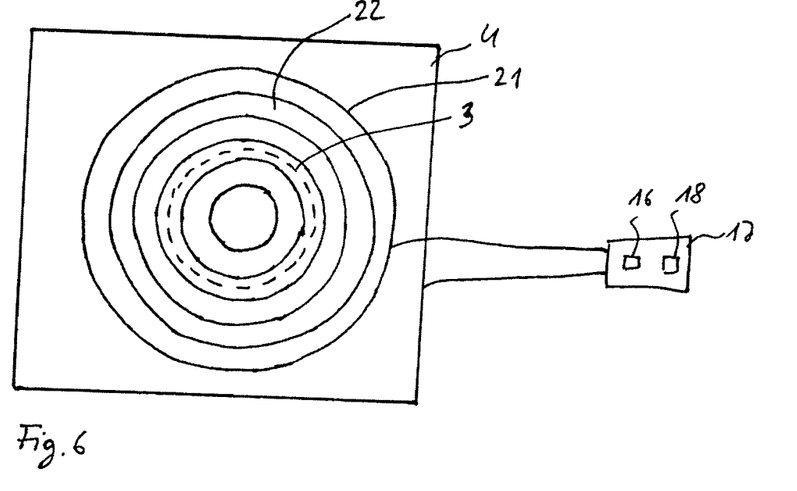
FIG. 6 is a sketch of a circular active surface.

FIG. 6 shows a sketch of an active surface 4, wherein in a central partial region a sensor surface 21 with circular touch sensors 22 is arranged. An object, namely a beverage container 3 is placed on the sensor surface 21, which is shown in dashed lines. The data of the touch sensors 22 are transmitted to the computer 17 and the analysis device 16, the analysis device 16 determining the dimensions of the object 3 and the active surface 4 being controlled by the control means 18 in such a way that a suitable recess 15 is formed, as shown in FIG. 2.

Figure 7:
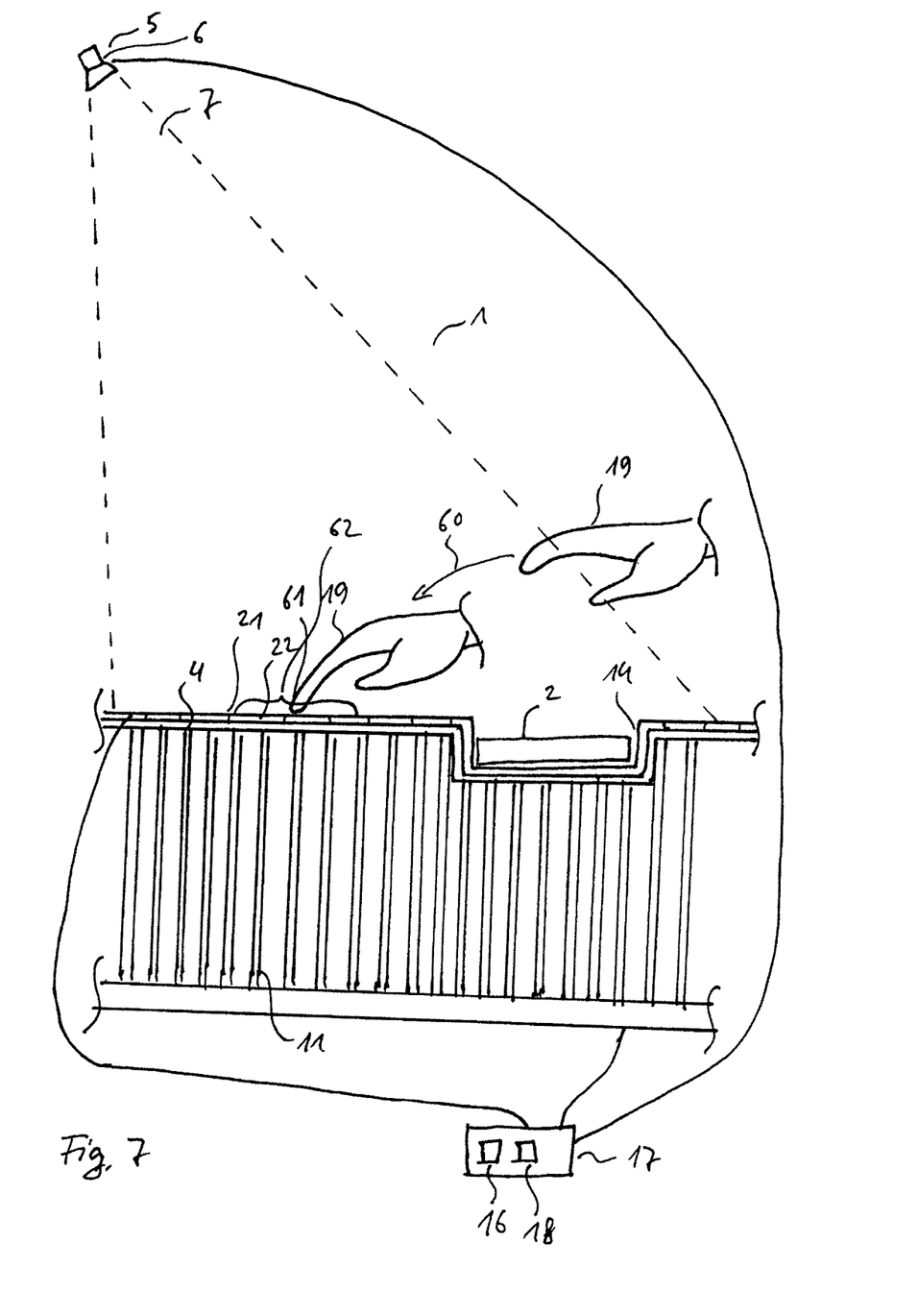
FIG. 7 is a sketch of an embodiment of the holding device.

FIG. 7 shows a sketch of an embodiment of the holding device 1 for holding an object, such as a mobile telephone 2, comprising the active surface 4, which is formed by means of the drive means 11 and is controlled by control means 18. The sensor surface 21 with the touch sensors 22 is arranged on the active surface 4 as an additional layer. As soon as the hand 19 of the user is detected using the sensor system 5 with a single camera 6 within the field of view 7 of the sensor system 5, the sensor surface 21 is activated. The user then moves the hand 19 to the sensor surface 21, as indicated by the arrow 60, wherein the user is touching the touch sensors 22 of the sensor surface 21 with a finger 61 of the hand 19. The user can execute different touch commands such as swipe, touch, press with one or more fingers. By executing a predefined touch command, such as touching a specific predefined area 62 of the sensor surface 21, the signals of the touch sensors 22 are forwarded to the computer 17 and the analysis device 16. A predefined control command is then forwarded from the control means 18 to the adjustment means 11 in order to form the predefined recess 14, which is shaped to match the object 2. After removing the hand 19 from the field of view 7 of the sensor system 5, the sensor surface 21 is deactivated again.

Figure 8:
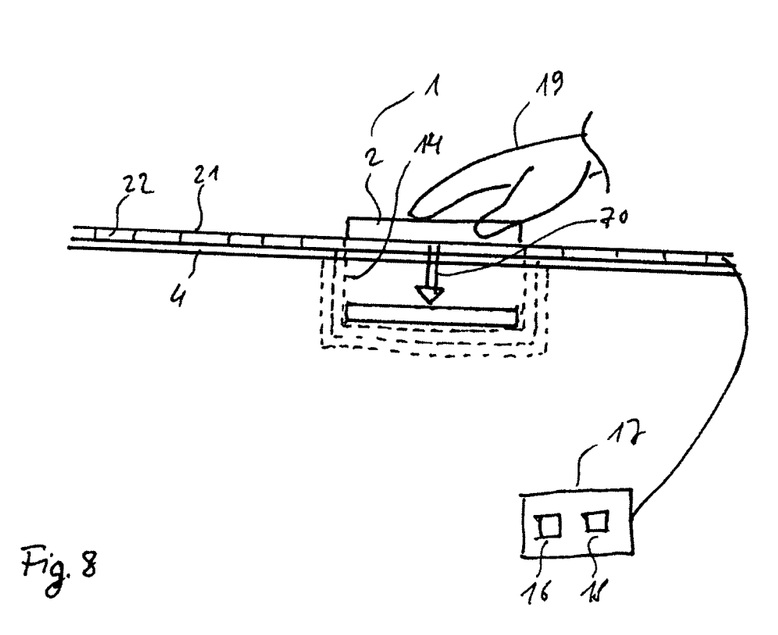
FIG. 8 is a sketch of a further embodiment of the holding device.

FIG. 8 shows as sketch a further embodiment of the holding device 1, the holding device 1 not having a sensor system 5 in comparison to the holding device from FIG. 1, but rather only a sensor surface 21 with touch sensors 22 being formed as an additional layer on the active surface 4. The user places the object, as a mobile phone 2, on the sensor surface 21 using his hand 19. The signals from the touch sensors 22 of the sensor surface 21 are then transmitted to the computer 17 and evaluated by means of the analysis device 16. Based on the signals, the analysis device 16 determines the dimensions and thus the model of the object 2, the drive means 11, not shown, are then being adjusted by means of the control means 18, as shown in FIG. 1, in order to form the recess 14, which is shown in dashed lines. The active surface 4 and the sensor surface 21 are consequently deformed, as shown in dashed lines, wherein the object, namely the mobile telephone 2, is sinking into the recess 14 and being held by it, as indicated by the arrow 70. In this embodiment of the holding device 1, a sensor system 5 with optical cameras is not necessary. The detection of the object 2 thus takes place solely by means of the sensor surface 21.

LIST OF REFERENCE NUMERALS 1 holder
2 mobile phone
3 beverage container
4 active surface
5 sensor system
6 first 2D optical camera
7 field of view of the first 2D camera
8 second optical 2D camera
9 field of view of the second 2D camera
10 adjustment means
11 drive means
12 bars
13 upper end
14 first recess
15 second recess
16 analysis device
17 computer
18 control means
19 hand
20 defined gesture
30 first predetermined region
31 original f of the first area
32 activated form of the first area
33 second predetermined region
34 original deactivated form of the second region
35 activated form of the second region
36 arrow 40-46 steps
50-54 steps
60 arrow
61 Finger
70 arrow

What is claimed is:

1. A holding device for a motor vehicle for holding an object, the holding device comprising:
   at least one active surface;
   one or more sensor systems configured to detect an approaching of the object towards a region of the at least one active surface, wherein the one or more sensor systems comprise at least one camera, wherein the at least one camera is configured to detect a shape or dimension of the object using a recognition algorithm;
   at least one adjustment means coupled to the at least one active surface, wherein the at least one adjustment means comprises one or more parallel bars; and
   a control unit configured to control the at least one adjustment means,
   wherein the control unit adjusts the one or more parallel bars to form a reception space for holding or receiving the object based on the detected shape or dimension of the object when the approaching of the object is detected by the one or more sensor systems, and
   wherein the reception space comprises a recess formed based on the detected shape or dimension of the object by the at least one active surface so that the object fits into the reception space formed at the at least one active surface,
   wherein the detection of the object is carried out by analyzing image data of the sensor system using a computer-based analysis device and the object is recognized using a recognition algorithm, and
   wherein, in order to release the object, when a body part or a user's hand is detected approaching the at least one active surface by the sensor system, the at least one active surface is retracted and the at least one adjustment means is adjusted to an original shape.

2. The holding device according to claim 1, wherein the at least one active surface is configured with one or more of a center console, a head unit, or a dashboard.

3. The holding device according to claim 1, wherein the adjustment means comprises at least one drive means, and the at least one drive means comprises an electric motor and is controlled by the control unit.

\* \* \* \* \*